Feb. 15, 1927.  
W. H. LANNING  
1,617,400  
VEHICLE ANCHORAGE DEVICE  
Filed Nov. 17, 1924
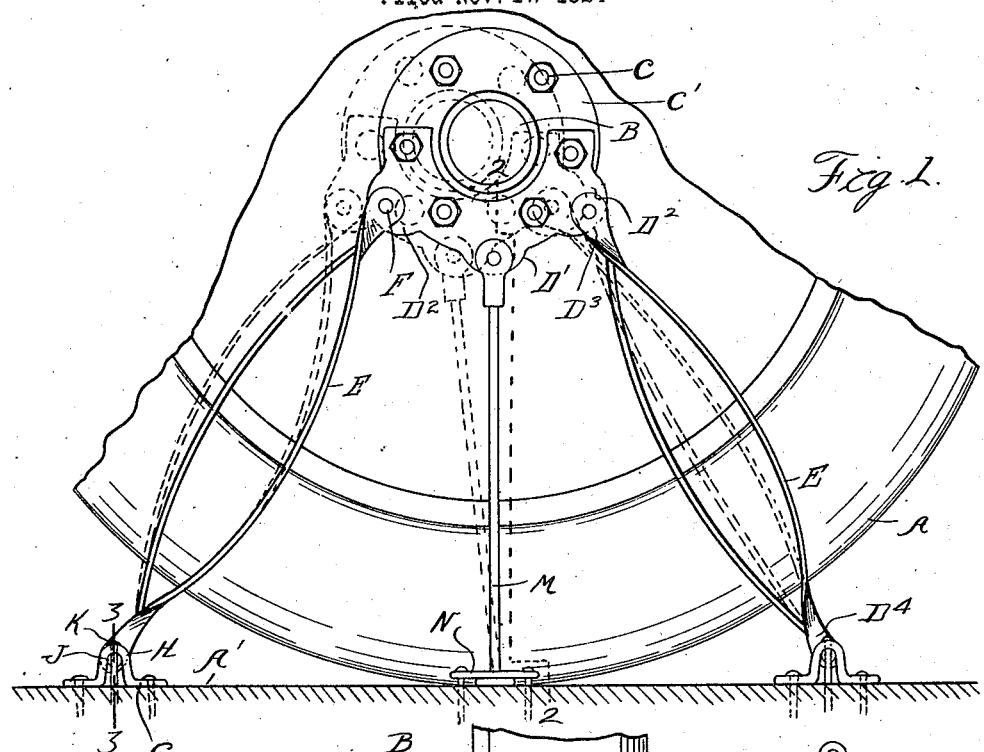
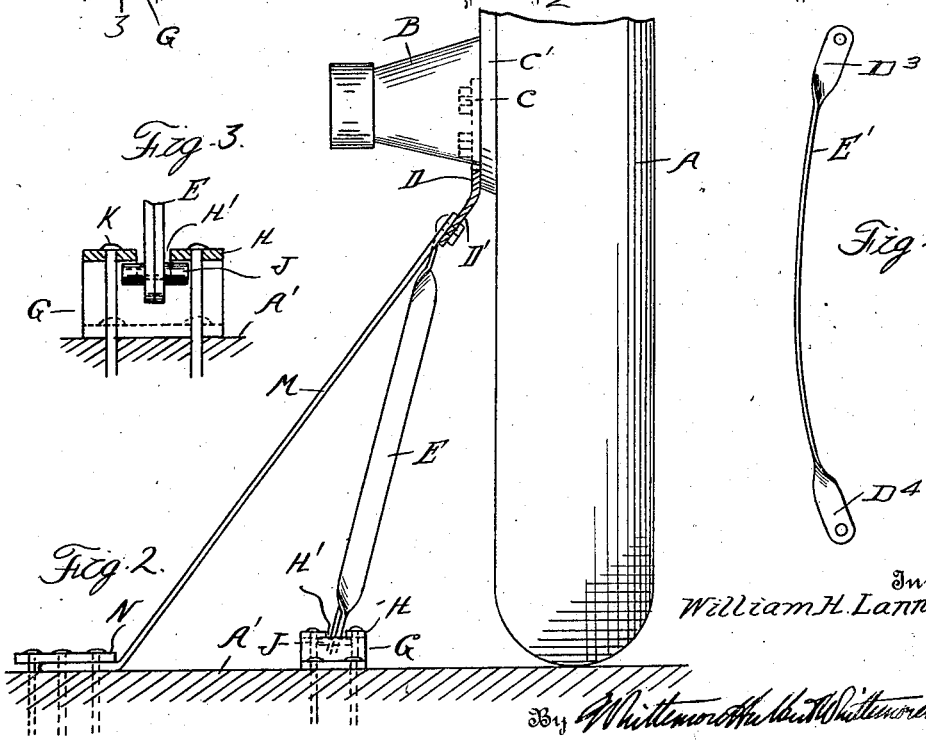
Inventor  
William H. Lanning Patented Feb. 15, 1927.

1,617,400

UNITED STATES PATENT OFFICE.

WILLIAM H. LANNING, OF DETROIT, MICHIGAN, ASSIGNOR TO WILLIAM W. BLAKELY, OF DETROIT, MICHIGAN.

VEHICLE ANCHORAGE DEVICE.

Application filed November 17, 1924. Serial No. 750,434.

This invention relates to vehicle anchorage devices for holding a vehicle properly positioned within a freight car or other carrier.

The invention consists primarily in an improved resiliently yieldable tie member, affording a vehicle anchored within a carrier, a slight rolling travel responsive to shocks and jars encountered in transit of the carrier, and in various other features.

In the drawings:

Figure 1 is a side elevation of the improved anchorage means engaging a vehicle wheel.

Figure 2 is a sectional view of the same taken on line 2—2 of Figure 1.

Figure 3 is a sectional detail taken on line 3—3 of Figure 1 showing the provision for attaching the tie member to a floor.

Figure 4 is a detail elevation of one of the resilient bars of my anchorage device.

In these views the reference character A designates a vehicle wheel which rests upon a floor A' of a freight car or other carrier, or upon any suitable support. The hub B of said wheel is secured to the wheel body by a plurality of bolts C, said hub having the usual flange C' for engagement by said bolts.

During shipment of the vehicle equipped with said wheel, a plate D is secured to the hub flange C' by certain of the bolts C. As shown, said plate has the form of a half ring which engages the flange C' beneath the hub B. Said plate is formed with a downwardly projecting lug D' and is further formed with two lugs D² projecting downwardly at an inclination respectively toward the front and back of the vehicle. The twisted upper ends of the oppositely bowed resilient metal bars E are connected by suitable pivot pins F to the lugs D². As shown, the end portions of each bar E are preferably twisted substantially 90° to provide suitable flat attaching portions D³ and D⁴ respectively. Said pairs of tie members extend forwardly and rearwardly, each bar being pivotally attached at its lower end to the surface A' by means of an anchorage plate G. Said plate has an arched central portion H which is slotted at H' to admit the lower ends of the ties E, a pivot pin J being engaged with said bars within the arch, and said pin being held in place by a pair of nails K or the like, driven into the surface A' through said arch. The ends of the bars E are twisted to engage each other and to engage the pivots F and J.

To the lug D' of the plate D there is pivotally attached the upper end of a tie member M which extends outwardly and downwardly from the wheel, its lower extremity being fastened to the support A' by means of an anchorage plate N.

In the use of the described construction, when the vehicle having the wheel A is subjected to any longitudinally acting shock, said vehicle is permitted to yield slightly to said shock as is indicated by dash lines in Figure 1, the effect of such movement being to decrease the curvature of one pair of the tie members E and increase the curvature of the other pair. Such a movement of the vehicle is cushioned by the yielding resistance of the bars E to elongation.

The purpose of the tie member M is primarily to resist stresses acting transversely upon the vehicle equipped with the wheel A and further to prevent any upward tilting of the engaged wheel.

By permitting a limited response of the anchored vehicle to shocks and jars encountered in transit, the described anchorage device materially relieves the vehicle from resulting stresses and strains.

If desired, the anchorage device may be provided with only one resilient bar E' at the front and rear of the rod M.

What I claim as my invention is:

1. A tie member for vehicle anchorage purposes comprising a pair of reversely bowed resilient metal bars, means for pivotally attaching corresponding ends of said bars to a vehicle and the other ends thereof to a fixed support.

2. In an anchorage device, a pair of reversely bowed resilient bars, a common means for securing the upper ends of said bars to a vehicle, and a common means for securing the lower ends of the bars to a support for the vehicle.

3. An anchorage device including a bowed resilient bar having an end thereof twisted substantially 90° to provide a flat attaching portion, a floor plate provided with an inverted U-shaped portion having a slot receiving the flat attaching portion, and a retainer pin in the inverted U-shaped portion of the plate extending through the flat attaching portion of the bar.

4. An anchorage device for a vehicle including an adapter plate, a floor plate, and a bowed spring metal bar adapted to yield longitudinally of the vehicle having end portions twisted substantially 90° to provide flat attaching portions, and pivots extending transversely of the vehicle connecting the flat attaching portions of said bar to said adapter plate and floor plate.

5. An anchorage device including a bowed resilient bar having a substantially flat attaching portion, a floor plate having a slot receiving the attaching portion, and a retainer pin extending through the flat attaching portion of the bar below a portion of said plate.

6. An anchorage device for a vehicle including an adapter plate, a floor plate, and a bowed spring metal bar adapted to yield longitudinally of the vehicle having substantially flat attaching portions, and pivots connecting the flat attaching portions of said bar to said adapter plate and floor plate.

In testimony whereof I affix my signature.

WILLIAM H. LANNING.